(No Model.)

L. S. COPPER.
BICYCLE SADDLE.

No. 351,251. Patented Oct. 19, 1886.

Witnesses,
M. L. Norton
A. B. Allen.

Inventor,
Luther S. Copper.
per Geo. W. Tibbitts Atty

UNITED STATES PATENT OFFICE.

LUTHER S. COPPER, OF CLEVELAND, OHIO.

BICYCLE-SADDLE.

SPECIFICATION forming part of Letters Patent No. 351,251, dated October 19, 1886.

Application filed March 10, 1886. Serial No. 194,710. (No model.)

*To all whom it may concern:*

Be it known that I, LUTHER S. COPPER, of Cleveland, in the county of Cuyahoga and State of Ohio, have invented certain new and useful Improvements in Bicycle-Saddles, of which the following is a specification.

This invention relates to saddles for bicycles, having for its object to provide an easy and comfortable riding-saddle; and it consists of a peculiarly-constructed spring for supporting the saddle, and the clamp for securing the spring to the backbone of the bicycle.

The said invention consists in the special construction and combination of parts, hereinafter set forth.

Figure 1:
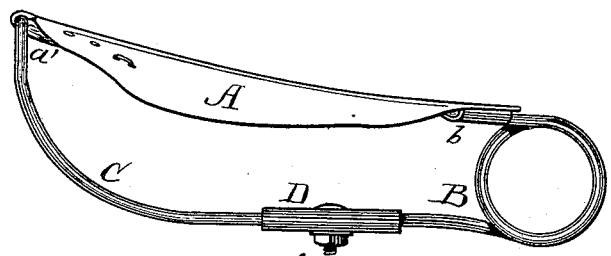
Figure 2:
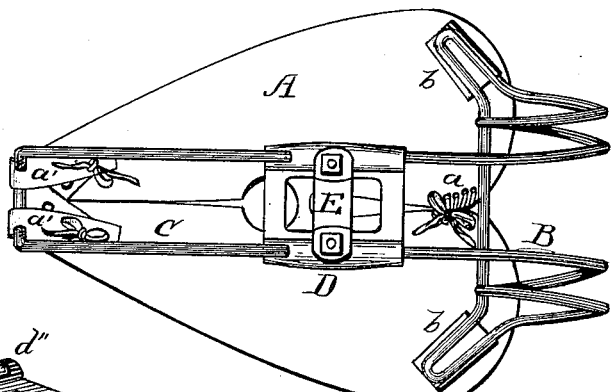
Figure 5:
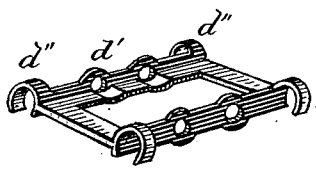
Figure 4:
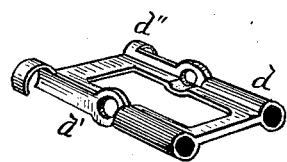
Figure 3:
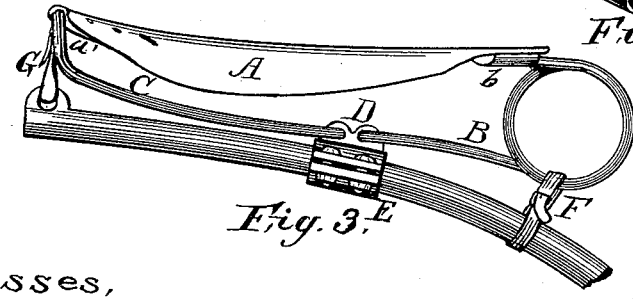

Referring to the drawings, Figure 1 is a side elevation of the saddle, spring, and clamp. Fig. 2 is an under side view of the same. Fig. 3 is a side view of a modification of saddle, spring, and clamp. Figs. 4, 5 are detached views of clamps in modified forms.

A is the seat, which is made of strong leather, which is bisected from each end to near the middle, and the two parts are adjustably joined at the rear end by means of a lacing-cord, $a$. The forward ends of the seat A are provided with straps $a'$, for securing it to the forward part of the spring by means of lacing-cords.

B is a spring made of wire in one piece, in the form shown, having one or more coils connected by a cross portion, which is attached to the seat by means of hook-plates $b$ $b$, the ends of the wire being fixed in a clamp, hereinafter described.

C is also a wire spring composed of one piece for supporting the forward end of the seat. The ends of the wire forming same are also fixed in the said clamp.

D is a clamp for securing the springs to the backbone of a bicycle. It consists of a plate or frame having sockets or holes $d$ $d'$, for receiving the ends of the wire. The plate D is secured to the backbone of a bicycle by means of a cross-bar, E, and bolts $e$ $e$. The ends of the wires may be inserted in the tubular sockets $d$, or the ends may have a short bend for entering the holes $d'$ transversely, and the hooks $d''$ at the corners embrace them on upper side. These are designed to form a joint, which will allow the springs to yield under the pressure of the rider.

In Fig. 3 the clamp is represented as being short and devoid of the hooks; but in lieu thereof straps F G with buckles are employed, by which the springs are held down in opposition to the strain of the seat.

In some instances, where the backbone is made of U-shaped angle-iron, the clamp may be dispensed with and the ends of the springs inserted in holes made in the sides of said iron.

In the rear portion of seat I make slots and unite the edges with lacing, or draw them together and secure them by attaching the hook-plates $b$ $b$ over the seam, the object being to pucker the edges to form basins in the broad part of the seat to render the seat more in conformity with the form of the rider.

Having described my invention, I claim—

1. The combination, with bisected seat A, of the spring B, consisting of a wire bent in the form shown and attached to the rear corners of said seat A by means of flat hooks $b$ $b$, and the spring C, curved upward to support the forward end of seat A, said springs being connected to and secured to backbone of the bicycle by clamp D, as shown and described.

2. The clamp D, consisting of frame or plate provided with sockets $d$ or holes $d'$ and hooks $d''$, and the under bar or plate, E, and bolts $e$ $e$, in combination with the springs B and C, supporting the seat A, and the backbone of a bicycle, substantially as described.

LUTHER S. COPPER.

Witnesses:
GEO. W. TIBBITTS,
F. W. CADWELL.